US012638824B2

(12) United States Patent
Feng et al.

(10) Patent No.: US 12,638,824 B2
(45) Date of Patent: May 26, 2026

(54) WORKLOAD THERMOLYSIS CURVES

(71) Applicant: Hewlett-Packard Development Company, L.P., Spring, TX (US)

(72) Inventors: Kang-Ning Feng, Taipei City (TW); Reily Chang, Taipei City (TW); Wei Chih Huang, Taipei City (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 489 days.

(21) Appl. No.: 17/800,852

(22) PCT Filed: Feb. 28, 2020

(86) PCT No.: PCT/US2020/020354
§ 371 (c)(1),
(2) Date: Aug. 18, 2022

(87) PCT Pub. No.: WO2021/173152
PCT Pub. Date: Sep. 2, 2021

(65) Prior Publication Data
US 2023/0085527 A1     Mar. 16, 2023

(51) Int. Cl.
G05B 19/4155         (2006.01)
(52) U.S. Cl.
CPC ..................... G05B 19/4155 (2013.01); G05B 2219/49216 (2013.01)
(58) Field of Classification Search
CPC ...... G05B 19/4155; G05B 2219/49216; G06F 1/206; Y02D 10/00
See application file for complete search history.

(56) References Cited

U.S. PATENT DOCUMENTS

| | | | |
|---|---|---|---|
| 6,620,222 B2 | 9/2003 | White | |
| 6,871,119 B2 * | 3/2005 | Samson | G05D 23/1919 |
| | | | 711/100 |
| 7,129,847 B2 * | 10/2006 | Right | G08B 17/10 |
| | | | 340/606 |
| 7,445,665 B2 | 11/2008 | Hsieh et al. | |
| 8,506,674 B1 | 8/2013 | Brown-Fitzpatrick et al. | |

(Continued)

FOREIGN PATENT DOCUMENTS

| | | |
|---|---|---|
| CN | 203208787 U | 9/2013 |
| CN | 107390842 A | 11/2017 |

(Continued)

OTHER PUBLICATIONS

Mahajan et al., Aug. 2006, "Cooling a Microprocessor Chip", Proceedings of the IEEE, vol. 94, No. 8, pp. 1476-1486 (Year: 2006).*

*Primary Examiner* — Scott T Baderman
*Assistant Examiner* — Mario M Velez-Lopez
(74) *Attorney, Agent, or Firm* — Quarles & Brady LLP

(57) ABSTRACT
In an example implementation according to aspects of the present disclosure, a system includes a thermal sensor and a processor. The processor determines that a workload surpasses a high workload threshold. The processor determines that the workload transcends a low workload threshold after the workload abates. The processor determines a measured thermolysis curve based on a reading from the thermal sensor. The processor compares the measured thermolysis curve against a target thermolysis curve and generates a filter event based on the comparing.

20 Claims, 4 Drawing Sheets

(56)          References Cited

U.S. PATENT DOCUMENTS

|  |  |  |  |  |
|---|---|---|---|---|
| 9,098,400 | B2 * | 8/2015 | El Maghraoui | G06F 3/061 |
| 10,133,483 | B2 * | 11/2018 | Postavilsky | G06F 3/0679 |
| 2005/0030172 | A1 | 2/2005 | Right et al. | |
| 2007/0144354 | A1 | 6/2007 | Muller et al. | |
| 2013/0250998 | A1 * | 9/2013 | Karaki | G01J 5/16 |
| | | | | 374/E7.004 |
| 2015/0260424 | A1 | 9/2015 | Fadell et al. | |
| 2015/0261281 | A1 * | 9/2015 | Bickelman | G05D 23/1393 |
| | | | | 713/322 |
| 2016/0116953 | A1 * | 4/2016 | Moore | G06F 11/3058 |
| | | | | 714/49 |
| 2021/0216216 | A1 * | 7/2021 | Brandt | G06F 3/0653 |
| 2022/0147279 | A1 * | 5/2022 | Goss | G06F 3/0679 |

FOREIGN PATENT DOCUMENTS

|  |  |  |  |
|---|---|---|---|
| GB | 2406692 | A | 4/2005 |
| JP | 2004-063993 | A | 2/2004 |
| JP | 4870059 | B2 | 2/2012 |
| JP | 2012-066190 | A | 4/2012 |
| JP | 2012066190 | * | 4/2021 |

* cited by examiner

200

202 — DETERMINE A WORKLOAD PASSES HIGH THRESHOLD

204 — DETERMINE WORKLOAD TRANSCENDS LOW THRESHOLD

206 — COLLECT A SERIES OF TEMPERATURE MEASUREMENTS

208 — DETERMINE A MEASURED THERMOLYSIS CURVE

210 — COMPARE THE MEASURED THERMOLYSIS CURVE AND THE TARGET THERMOLYSIS CURVE

212 — GENERATE A FILTER EVENT

WORKLOAD THERMOLYSIS CURVES

BACKGROUND

Computing systems utilize various types of micro-processing devices to process workloads. During the processing, a microprocessor may generate heat which may be dissipated by airflow.

DETAILED DESCRIPTION

In computing systems, microprocessors may generate heat. The heat may be removed from the system utilizing various different techniques. Air cooling may be a popular method, as air cooling is inexpensive, predictable and effective. When moving volumes of air through a computing system, dust particulate may accumulate on surfaces. As more dust accumulates, the effectiveness of the ail cooling technique may diminish. To limit dust in a system, an air intake for an air-cooling system may incorporate an air filter. As the dust accumulates in the air filter, the volume of air passing through the computing system may diminish, thereby limiting the air-cooling system's ability to remove heat from a microprocessor within the computing system. It is described herein, a system, method and computer readable medium collect temperature measurements, determine a measured thermolysis curve, compare the measured thermolysis curve to a target thermolysis curve, and the generation of a filter event based on the comparison.

It is to be understood that for purposes of this disclosure thermolysis corresponds to the dissipation of heat from a system through evaporation or radiation. A thermolysis curve may be a representation of the dissipation of heat over time.

Figure 1:
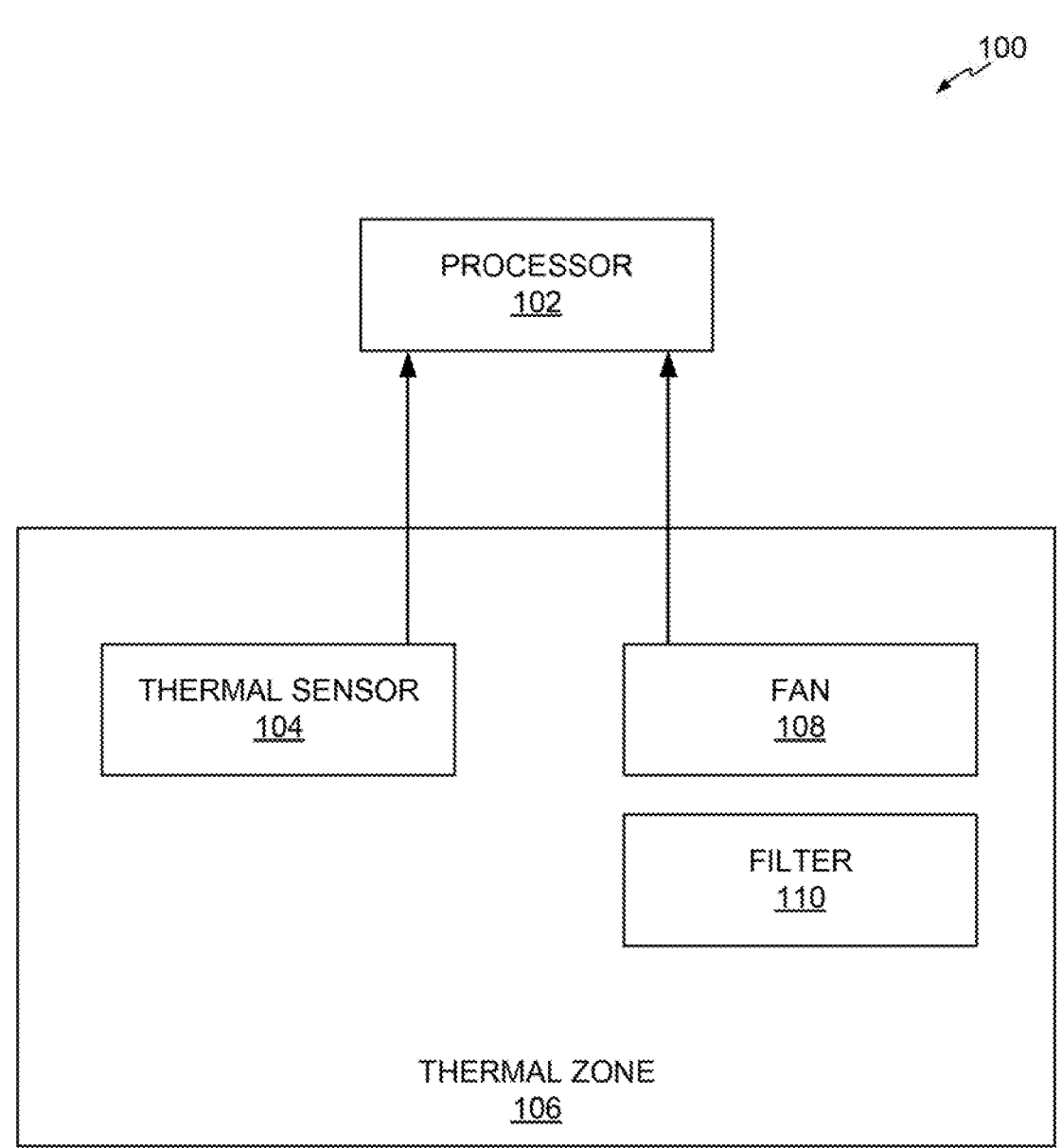
FIG. 1 illustrates a system to measure and determine a measured thermolysis curve, according to an example.

FIG. 1 illustrates a system 100 to measure and determine a measured thermolysis curve, according to an example. The system may include a processor 102 and a thermal sensor 104. The processor 102 may be implemented as a general-purpose processor such as a central processing unit (CPU). In another implementation, the processor 102 may take the form of an application specific integrated circuit (ASIC) coupled to the thermal sensor 104. The processor 102 may also be implemented as a virtual processor. A virtual processor may be abstracted from a specific piece of hardware and may be defined by the workload it processes. A virtual processor may be a cloud processing instance, or a virtual machine instance.

Within the system, processor 102 may monitor a workload. The workload may correspond to various executable software packages designed to operate on components within the thermal zone 106. In one example, the workload may correspond to executing software on the processor 102. In another example, the workload may correspond to software executing on a GPU. The workload may have a direct correlation to any heat generated within the thermal zone 106. During times of high workload, more energy may be required and thereby more energy may be dissipated into the surrounding thermal zone 106. The processor 102 may determine that a workload surpasses a high workload threshold. The high workload threshold may be exemplified as a utilization metric, such as but not limited to processor utilization percentage. For example, a high workload threshold may correspond to the processor 102 in the thermal zone 106 operating at 80 percent load. The high workload threshold may be specified and may vary for different thermal zones.

Additionally, through the monitoring, the processor 120 may determine that the workload transcends a low workload threshold. The low workload threshold may correspond to an abatement in the workload after surpassing the high workload threshold. The low workload threshold may correspond to when a workload has been completed and computing within the thermal zone 106 may be returning to idle. Alternatively, low workload threshold may indicate a trend in the workload indicated less utilization but not complete idle.

Upon the transition of the workload below the low workload threshold, the processor 102 may determine a measured thermolysis curve. The measured thermolysis curve may be based on a reading from the thermal sensor responsive to the workload transcending the low workload threshold. The measured thermolysis curve may be indicative of the temperature recorded within the thermal zone 106 after the workload has abated. Described another way, the measured thermolysis curve indicates a speed at which heat is removed from the thermal zone 106 after the workload has abated.

Once a measured thermolysis curve has been determined, the processor 102 may compare the measured thermolysis curve against a target thermolysis curve. The processor 102 may determine a deviation between the measured thermolysis curve and the target thermolysis curve. In one implementation, the deviation may be represented as a percent deviation from the target thermolysis curve. The target thermolysis curve may correspond to a desired thermal profile for a thermal zone 106. In some implementations, the measured thermolysis curve may be transmitted and used as a feedback input to a cloud-based system, which updates the target thermolysis curve.

Based on the comparison of the measured thermolysis curve and the target thermolysis curve, the processor may generate a filter event. A filter event may correspond to a percent deviation in the measured thermolysis curve and the target thermolysis curve, indicating a cooling problem. In some instances, a clogged or old filter may be limiting airflow. The percent deviation passing a deviation threshold may indicate filter replacement. The filter event may include a notification to a user to replace the filter. The notification may be an auditory or visual code presented by processor 102. An example of an auditory code may be a beep code, or beep pattern. Likewise, a visual code may include a flashing light emitting diode (not shown) within the thermal zone. In another example, the notification of filter event may be a higher-level application notification. An application executing on the processor 102 may receive and inter process message or event, presenting the notification. The notification of filter event may be a "pop up" notifying a user to clean or replace the filter. In another example, the notification of filter event may be a log message.

A thermal zone 106 may be a location within a computing device that may be sensitive to temperatures. In a desktop computing environment, the space around the CPU of the desktop computer may be a thermal zone 106. In a notebook computing environment, the space around a discrete graphics processing unit (GPU) may be a thermal zone 106. The CPU and GPU in the aforementioned environments may be temperature sensitive due to the electrical components utilized. Additional areas that may correspond with a thermal zone 106 may include voltage regulator modules, and power supply circuitry. In each example, the components may be adversely affected by heat and thereby may be monitored for heat buildup. Within any computing environment, there may be more than one thermal zones. The thermal zones may also correlate with the cooling device utilized to remove heat from that thermal zone. For example, one thermal zone 106 may utilize one fan to support a CPU and GPU, whereas another thermal zone may utilize another fan to support power supply circuitry.

Within the thermal zone 106 may be a thermal sensor 104. The thermal sensor 104 may be communicatively coupled to the processor 102. The coupling may be direct electrical wiring supporting the communication of temperature data from the thermal sensor 104. In another implementation, the coupling may be wirelessly abstracted via transceivers (not shown) between the thermal sensor 104 and processor 102. The thermal sensor 104 may be implemented as a thermistor. In another example, the thermal sensor 104 may be a micro-electromechanical system (MEMS) thermal sensors.

Additionally, within the thermal zone 106 may be a fan 108 and a filter 110. The fan 108 may be controlled via the processor 102 based on temperature data received from the thermal sensor 104 corresponding to the thermal zone 106. The filter 110 may be used to eliminate dust and particulate from entering the thermal zone 106. Periodically the filter 110 may need to be replaced.

Figure 2:
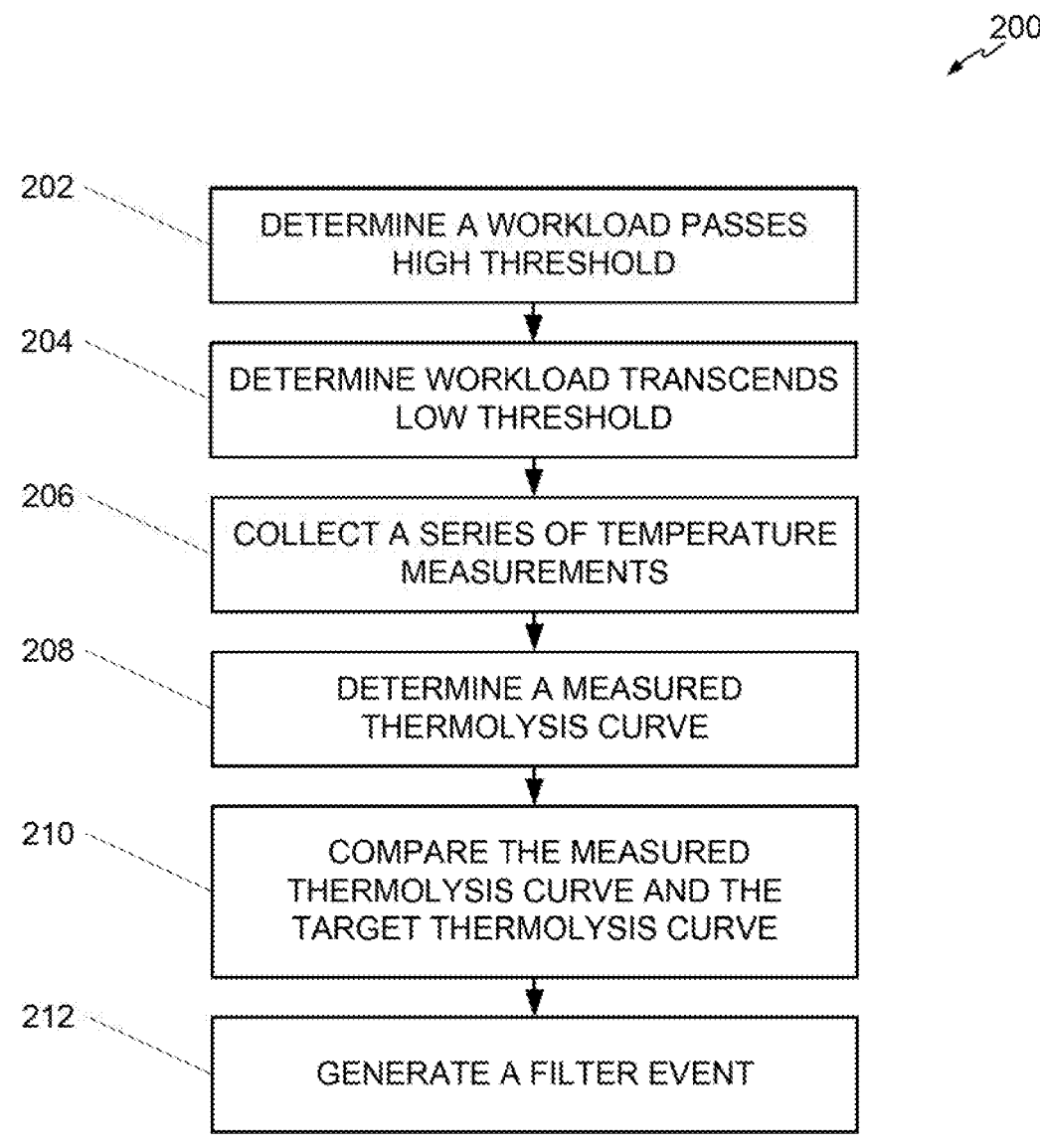
FIG. 2 is a block diagram corresponding to a method of determining a measured thermolysis curve, according to an example.

FIG. 2 is a block diagram 200 corresponding to a method determining a measured thermolysis curve, according to an example. Referring back to FIG. 1, the processor 102 may monitor a workload corresponding to a thermal zone 106.

At 202, the processor 102 determines that a workload surpasses a high workload threshold. As described previously, the processor 102 monitors a workload corresponding to a thermal zone 106. At 204, the processor 102 determines that the workload transcends a low workload threshold. The low workload threshold corresponds to an abatement in the workload after surpassing the high workload threshold.

At 206, the processor 102 collects a series of temperature measurements during a period of time after the abatement. The series of temperature measurements may correspond to temperature measurements taken at a periodic interval. For example, the processor 102 may poll the thermal sensor 104 periodically. The period of time after abatement may correspond to a wait time after the abatement for the processor 102 to determine that the workload stays below the low workload threshold.

The processor 102 may determine, responsive to the workload transcending the low work threshold, a time value. The time value may correspond to a period of time wherein the workload remains below the low work threshold. In one example, the time value may correspond to a digital representation of the period of time, such that the processor 102 may manipulate a representation of the period of time. The processor 102 may compare the time value to a time value threshold. The time value threshold may correspond to a collection time of a sample thermolysis curve. The sample thermolysis curve may be a candidate measured thermolysis curve. In order for the sample thermolysis curve to be utilized as a measured thermolysis curve, the time value corresponding to the sample thermolysis curve may surpass the time value threshold. In other words, in order for a sample thermolysis curve to be used as the measured thermolysis curve, the sample thermolysis curve may cover a given time of the workload.

The processor 102 may discard the sample thermolysis curve responsive to the time value being less than the time value threshold. When the sample thermolysis curve does not correspond to an adequate time value, the sample thermolysis curve represents an inaccurate data point and may be discarded.

At 208, the processor 102 determines a measured thermolysis curve based on the series of temperature measurements responsive to the workload transcending the low workload threshold. The sample thermolysis curve with an adequate time value (e.g. the time value is greater than the time value threshold) may be used as a measured thermolysis curve as the sample thermolysis curve represents an acceptable data point.

At 210, the processor 102 compares the measured thermolysis curve against a target thermolysis curve. As described above, the processor 102 determines a deviation of the measured thermolysis curve versus the target thermolysis curve. The deviation may be represented as a percent deviation.

At 212, the processor 102 generates a filter event based on the comparing. The filter event may correspond to the deviation of the measured thermolysis curve versus the target thermolysis curve exceeding a deviation threshold. The deviation may correspond with a lack of air flow through the thermal zone 106. The lack of air flow may correspond to a clogged or defective filter which needs replacement.

The processor 102 may transmit the filter event to a cloud-based system. The cloud-based system may correspond to a computing device fleet management system. The filter event may include information pertaining to the computing device where the thermal zone 106 is located. The filter event may provide the cloud-based system information including the measured thermolysis curve. The cloud-based system may use the included measured thermolysis curve to update the target thermolysis curve such that the target thermolysis curve may become an aggregated system benchmark. The aggregated system benchmark corresponds to an updated target thermolysis curve corresponding to measured thermolysis curves from many thermal zones 106 of similar purpose and scope. For example, the aggregated system benchmark may correspond with an updated target thermolysis curve as determine by a fleet of the equivalent computer systems.

Figure 3:
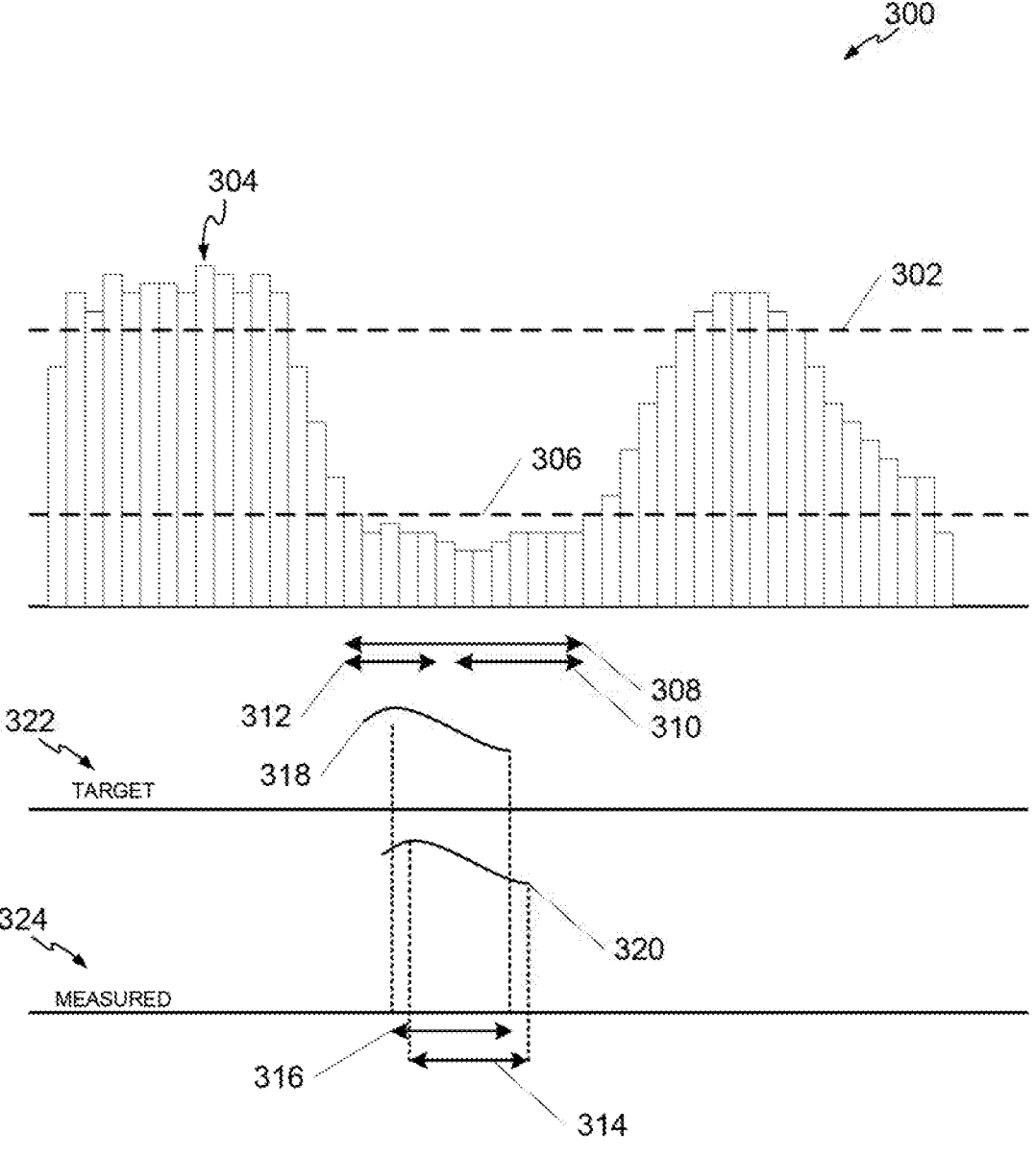
FIG. 3 is an illustration of a target thermolysis curve and a measured thermolysis curve, according to an example.

FIG. 3 is an illustration 300 of a target thermolysis curve and a measured thermolysis curve, according to an example. FIG. 3 provides a graphic illustration demonstrating the relationship between workload, time and temperature. The x-axis of the illustration from left to right represents time progression. The y-axis, in relation to the workload 304, represents relative workload intensity. The y-axis, in relation to the target sample 322 and the measured sample 324, represents temperature.

As described above, the workload 304 may correspond to various executable software packages designed to operate on components within the thermal zone 106. As represented in FIG. 3, the workload 304 may be discrete time-based measurements, corresponding to the execution of the various executable software packages. A high workload threshold 302 may be used to determine a thermal peak, whereby the thermal zone 106 may be in a state of thermal stress. A fan 108 may be activated under this thermal stress.

As the workload abates the low workload threshold 306 may be passed. The low workload threshold 306 may be a determination point for thermal sampling. The thermal sampling may be used to determine a measured thermolysis curve 320.

A sampling time 308 may be the time used to validate any sampled thermolysis curve 320. As described previously, the sampling time 308 may correspond to the period of time as well as the time value. The sampling time 308 may determine the accuracy of the data point and whether a sampled thermolysis curve becomes a measured thermolysis curve.

The offset time 312 may be a duration after the workload is lower than lower threshold. In some implementations, the offset time 312 may be utilized as a safeguard to verify that the workload 304 remains below the low workload threshold 306. The offset time 312 offers a time buffer prior to measuring temperatures.

The measurement time 310 may be a duration for sampling temperatures of the thermal zone 106 with the thermal sensor 104. The measurement time 310 may be long enough that a sample thermolysis curve may be determined.

A target sample 322 may visualize a target thermolysis curve 318 in the context of the workload 304. The target sample 322 visualizes the target thermolysis curve 318 in time (x-axis) and temperature (y-axis). Within the target sample 322, the target thermolysis curve 318 represents an expected cooling effect within the thermal zone 106 after the workload 304 abates. The target cool down period 316 corresponds to a similar period of time as the measurement time 310.

The measured sample 324 may visualize a measured thermolysis curve 320 in the context of the workload 304. As with the target sample, visualizes the measured thermolysis curve 318 in time (x-axis) and temperature (y-axis). Within the measured sample 322, the measured thermolysis curve 320 represents a measured cooling effect within the thermal zone 106 after the workload 304 abates. The measured cool down period 314 corresponds to a similar period of time as the measurement time 310.

In the illustration of FIG. 3, the target thermolysis curve 318 and the measured thermolysis curve 320 show a deviation. The measured thermolysis curve 320 lags the cooling trend of the target thermolysis curve 318.

In the aggregate of a system with many thermal zones, a history of measured thermolysis curves may be collected. The history may be utilized to provide a holistic view of the system. For example, a filter event may be generated when all of the measured thermolysis curves 320 of a system deviate within a percentage from the target thermolysis curve 318. As exemplified in table 1, a generated filter event may happen when thermal zones 1 through thermal zones N surpass a deviation threshold.

TABLE 1

| Thermal Zone 1 | 1% | 2% | 6% | 7% |
| Thermal Zone 2 | 2% | 1% | 5% | 5% |
| . . . | | | | |
| Thermal Zone N | 1% | 1% | 4% | 5% |

Figure 4:
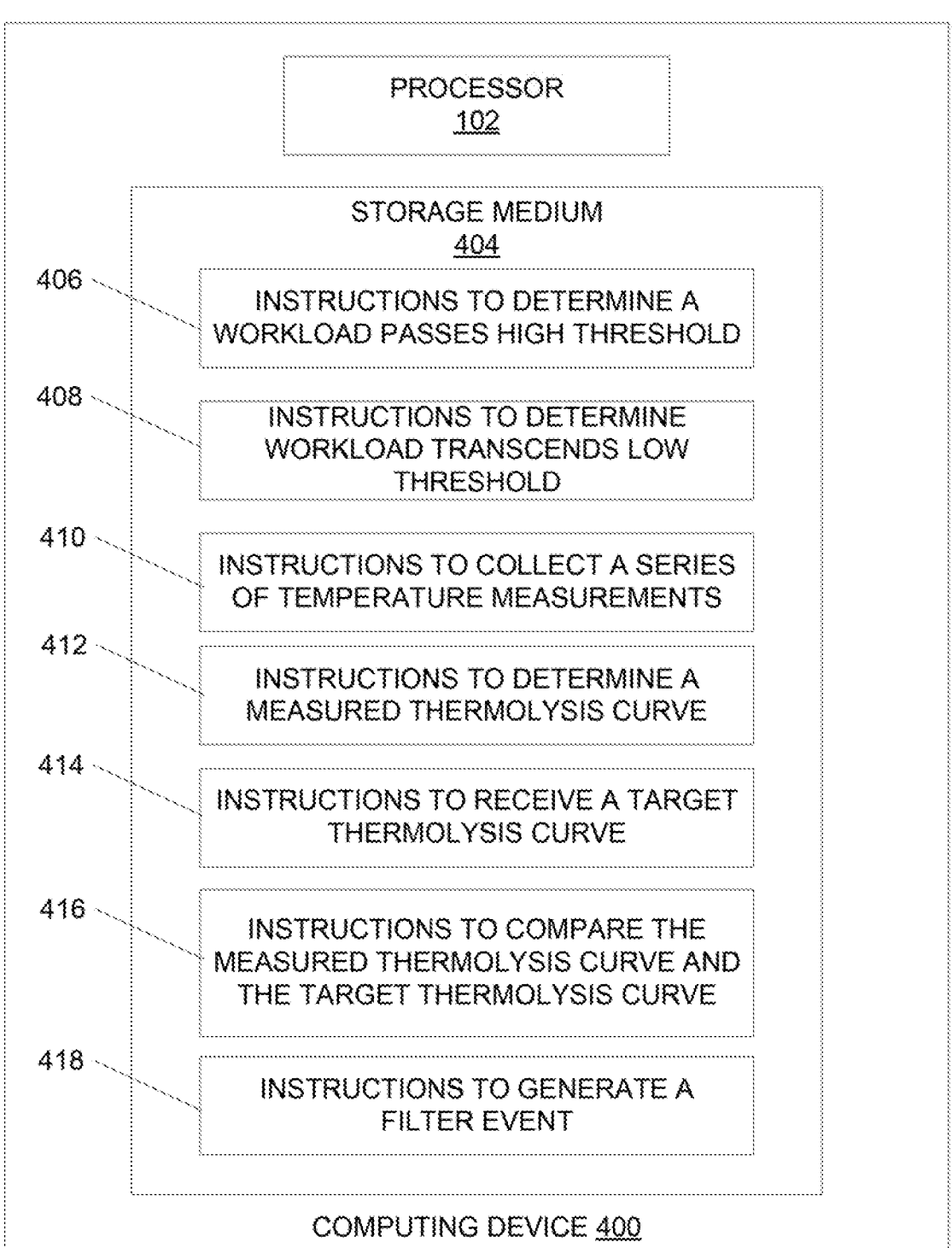
FIG. 4 is a computing device for supporting instructions for generating a filter event based on a measured thermolysis curve, according to an example.

FIG. 4 is a computing device for supporting instructions for generating a filter event based on a measured thermolysis curve, according to an example. The computing device 400 depicts a processor 102 and a storage medium 404 and, as an example of the computing device 400 performing its operations, the storage medium 404 may include instructions 406-418 that are executable by the processor 102. The processor 102 may be synonymous with the processor 102 referenced in FIG. 1. Additionally, the processor 102 may include but is not limited to central processing units (CPUs). The storage medium 404 can be said to store program instructions that, when executed by processor 102, implement the components of the computing device 400. The executable program instructions stored in the storage medium 404 include, as an example, instructions to determine a workload passes a high threshold 406, instruction to determine a workload transcends a low threshold 408, instructions to collect a series of temperature measurements 410, instructions to determine a measured thermolysis curve 412, instructions to receive a target thermolysis curve 414, instructions to compare the measured thermolysis curve and the target thermolysis curve 416, and instructions to generate a filter event 418.

Storage medium 404 represents generally any number of memory components capable of storing instructions that can be executed by processor 102. Storage medium 404 is non-transitory in the sense that it does not encompass a transitory signal but instead is made up of at least one memory component configured to store the relevant instructions. As a result, the storage medium 404 may be a non-transitory computer-readable storage medium. Storage medium 404 may be implemented in a single device or distributed across devices. Likewise, processor 102 represents any number of processors capable of executing instructions stored by storage medium 404. Processor 102 may be integrated in a single device or distributed across devices. Further, storage medium 404 may be fully or partially integrated in the same device as processor 102, or it may be separate but accessible to that computing device 400 and the processor 102.

In one example, the program instructions 406-418 may be part of an installation package that, when installed, can be executed by processor 102 to implement the components of the computing device 400. In this case, storage medium 404 may be a portable medium such as a CD, DVD, or flash drive, or a memory maintained by a server from which the installation package can be downloaded and installed. In another example, the program instructions may be part of an application or applications already installed. Here, storage medium 404 can include integrated memory such as a hard drive, solid state drive, or the like.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:

1. A system comprising:

a thermal sensor to sample a temperature of a thermal zone of the system and output a reading;

a processor communicatively coupled to the thermal sensor, the processor to:

monitor a workload of a micro-processing device in the thermal zone;

determine that the workload surpasses a high workload threshold;

determine that the workload transcends a low workload threshold, wherein the low workload threshold corresponds to an abatement in the workload after surpassing the high workload threshold;

determine a measured thermolysis curve based on a reading from the thermal sensor, responsive to the workload transcending the low workload threshold;

compare the measured thermolysis curve against a target thermolysis curve; and generate a filter event based on the comparing, wherein the filter event indicates to change a filter associated with the thermal zone.

2. The system of claim 1, further comprising the processor to:

transmit the measured thermolysis curve to a cloud-based system, wherein the cloud-based system utilizes the measured thermolysis curve in calculating an updated target thermolysis curve.

3. The system of claim 2, further comprising the processor to transmit the filter event to the cloud-based system.

4. The system of claim 1, further comprising the processor to:

determine, responsive to the workload transcending the low work workload threshold, a time value, wherein the time value corresponds to a period of time wherein the workload remains below the low workload threshold;

compare the time value to a time value threshold; and discard a sample thermolysis curve responsive to the time value being less than the time value threshold.

5. The system of claim 4, wherein the time value corresponds to a collection time of the sample thermolysis curve.

6. The system of claim 1, wherein the micro-processing device is at least one of a graphics processing unit or a central processing unit.

7. The system of claim 6, wherein the thermal zone is a location within a computing device that includes the micro-processing device, the thermal sensor, and a fan, and wherein, to generate the filter event, the processor is to:

output a notification as an auditory or visual code to indicate to change the filter associated with the thermal zone.

8. The system of claim 7, wherein, to output the notification as an auditory or visual code, the processor is to at least one of:

transmit an inter process message to an application to cause presentation of the notification, or cause presentation of the notification as a pop up notification.

9. A method comprising:

monitoring a workload of a micro-processing device in a thermal zone;

determining that the workload surpasses a high workload threshold;

determining that the workload transcends a low workload threshold, wherein the low workload threshold corresponds to an abatement in the workload after surpassing the high workload threshold;

collecting, from a thermal sensor to sample a temperature of the thermal zone, a series of temperature measurements during a period of time after the abatement;

determining a measured thermolysis curve based on the series of temperature measurements, responsive to the workload transcending the low workload threshold;

comparing the measured thermolysis curve against a target thermolysis curve; and generating a filter event based on the comparing, wherein the filter event indicates to change a filter associated with the thermal zone.

10. The method of claim 9, further comprising transmitting the measured thermolysis curve to a cloud-based system, wherein the cloud-based system utilizes the measured thermolysis curve in calculating an updated target thermolysis curve.

11. The method of claim 9, further comprising transmitting the filter event to a cloud-based system.

12. The method of claim 9, further comprising:

determining, responsive to the workload transcending the low workload threshold, a time value, wherein the time value corresponds to a period of time wherein the workload remains below the low workload threshold;

comparing the time value to a time value threshold; and discarding a sample thermolysis curve responsive to the time value being less than the time value threshold.

13. The method of claim 12, wherein the time value corresponds to a collection time of the sample thermolysis curve.

14. The method of claim 9, wherein the workload corresponds to a processing utilization percentage of the micro-processing device.

15. A non-transitory computer readable medium comprising instructions executable by a processor to:

monitor a workload of a micro-processing device in a thermal zone;

determine that the workload surpasses a high workload threshold;

determine that the workload transcends a low workload threshold, wherein the low workload threshold corresponds to an abatement in the workload after surpassing the high workload threshold;

collect, from a thermal sensor to sample a temperature of the thermal zone, a series of temperature measurements during a period of time after the abatement;

determine a measured thermolysis curve based on the series of temperature measurements, responsive to the workload transcending the low workload threshold;

receive a target thermolysis curve from a cloud-based system, wherein the target thermolysis curve corresponds to an aggregated system benchmark;

compare the measured thermolysis curve against the target thermolysis curve; and generate a filter event based on the comparing, wherein the filter event indicates to change a filter associated with the thermal zone.

16. The computer readable medium of claim 15, further comprising instructions executable by the processor to transmit the measured thermolysis curve to the cloud-based system, wherein the cloud-based system utilizes the measured thermolysis curve in calculating an updated target thermolysis curve.

17. The computer readable medium of claim 15, further comprising instructions executable by the processor to transmit the filter event to the cloud-based system.

18. The computer readable medium of claim 15, further comprising instructions executable by the processor to:

determine, responsive to the workload transcending the low workload threshold, a time value, wherein the time value corresponds to a period of time wherein the workload remains below the low workload threshold;

compare the time value to a time value threshold; and discard a sample thermolysis curve responsive to the time value being less than the time value threshold.

19. The computer readable medium of claim 18, wherein the time value corresponds to a collection time of the sample thermolysis curve.

20. The computer readable medium of claim 15, wherein the workload corresponds to a processing utilization percentage of the micro-processing device.

\* \* \* \* \*